Nov. 29, 1949     N. A. TUCKER     2,489,992

WELDING ELECTRODE HOLDER

Filed Oct. 28, 1947

INVENTOR.
Norman A. Tucker
BY
Nicholas Lange
ATTORNEY

Patented Nov. 29, 1949

2,489,992

UNITED STATES PATENT OFFICE 2,489,992

WELDING ELECTRODE HOLDER

Norman Albert Tucker, London, England, assignor to P. R. Mallory & Co., Inc.

Application October 28, 1947, Serial No. 782,489
In Great Britain August 28, 1946

6 Claims. (Cl. 219—4)

This invention relates to improvements in and relating to shanks or holders for tools, the tips of which are liable in use to become overheated, which shanks or holders are consequently provided with means for the circulation of coolant fluid therethrough. For this purpose, the tool shank or holder, which may be either straight or curved, is usually made hollow and incorporates a tube of smaller diameter than the bore of the holder, the tube providing a passageway for the coolant fluid in one direction and the annular space surrounding the said tube allowing for the return flow. In the manufacture of such a device no difficulty arises in the case of a straight shank or holder, in inserting the tube into the hollow shank, but in the case of curved shanks or holders in which the tool tip is offset laterally with respect to the main body of the shank or holder, it is necessary to cast the curved or bent shank or holder and the tube in situ.

One practical example of such a device is in connection with electrode holders for use in resistance or spot welding machines, which holders are sometimes made curved or bent so that the electrode carried thereby is offset with respect to the main body of the holder to enable welding operations to be carried out in positions otherwise difficult of access.

In the case of a straight shanked electrode holder, the cooling of the electrode is usually carried out in the manner above referred to, the manufacture of the holder involving no difficulties in practice.

In the case of curved electrode holders, however, it is usual to provide one straight portion of the holder, i. e. that part carrying the coolant fluid inlet and outlet connections, with two internal tubes and to form the other part of the holder with an internal passageway leading to one of the tubes and having a single tube therein, of smaller diameter than the bore of the passageway, communicating with the other of the said first-mentioned tubes, the said single tube projecting at its outer end into the electrode proper.

In manufacturing such an electrode holder it is customary to cast the holder, which may, for example, consist of copper, with one straight shank portion surrounding the two aforesaid inlet and outlet tubes and to cast the offset portion of the shank as a solid rod. This solid portion is then bored to communicate with the inner end of one of the said tubes and a tube of smaller diameter than the bore is then inserted therein, as far as the inner end of the said bore. The solid metal is then provided with a smaller bore, preferably substantially equal to the diameter of the said tube, so as to put the latter in communication with the other of the said two first-mentioned tubes.

Such a method of construction is obviously complicated and necessitates, in use, the provision of a plurality of separate holders, each having a different angle of curvature of the shank to be used, dependent on the nature of the particular work in hand.

Now, the principal object of this invention is to provide a simplified form of, and method of constructing, a curved tool shank or holder, such as an electrode holder, having means associated therewith for the circulation of coolant fluid therethrough.

To this end, according to one feature of the invention, I provide a method of making a curved tool shank or holder of the kind referred to which comprises the steps of (1) forming a straight shank or body portion having a bore therein adapted at one end thereof to communicate with or to form a fluid inlet or outlet opening, (2) inserting in said bore a tube of a diameter substantially equal to, but of a cross-section different from, that of said bore, said tube extending to any desired extent along the length of the shank and contacting with the said bore throughout the length thereof at spaced points only around the periphery of the bore and said tube being adapted to communicate with a fluid outlet or inlet opening and the space or spaces between the outer surface of said tube and the periphery of said bore forming a passageway or passageways for coolant fluid along said bore and (3) forming at least one bend in said shank and said tube at any desired point or points along the length of the inserted tube to form a curved shank or holder allowing of uninterrupted flow of coolant fluid in both directions therealong.

The bore of the shank or body portion is preferably of circular cross-section and the tube of square cross-section, although, if desired, the latter may have any other suitable cross-section, such as diamond or heart-shaped.

According to a further feature of the invention, I provide a tool shank or tool holder of the kind referred to comprising a hollow curved shank or body portion having in the bore thereof, at least at the end of each portion thereof at which the curve or curves is or are located, a tube or tube portion of a diameter substantially equal to, but of a cross-section different from, that of said bore, said tube following the contour of the said bore and engaging therewith throughout its length at spaced points only around the periphery of the bore and the interior of the tube communicating with an inlet or outlet opening for coolant fluid and the space, or at least one of the spaces, formed between said tube and said bore forming a passageway for the fluid and communicating with the coolant outlet or inlet opening.

To the rear end of the shank is preferably detachably fitted a hollow extension carrying lateral fluid inlet and outlet connections communicating respectively with the bore of the tube and the said intermediate space or spaces.

When the device is intended to form a holder for a resistance welding electrode, the outer end of the bore thereof may be suitably tapered for the reception of the correspondingly tapered end of the electrode. In this case the end of the aforesaid tube is preferably formed with a resiliently flexible portion, which is advantageously constructed in the manner set forth in my copending application Serial No. 752,053, now Patent No. 2,475,209, dated July 5, 1949.

In order that the invention may be fully understood, I shall now describe one embodiment thereof, by way of example, as applied to a holder for a resistance welding electrode, by reference to the accompanying drawings, in which.

Figure 1:
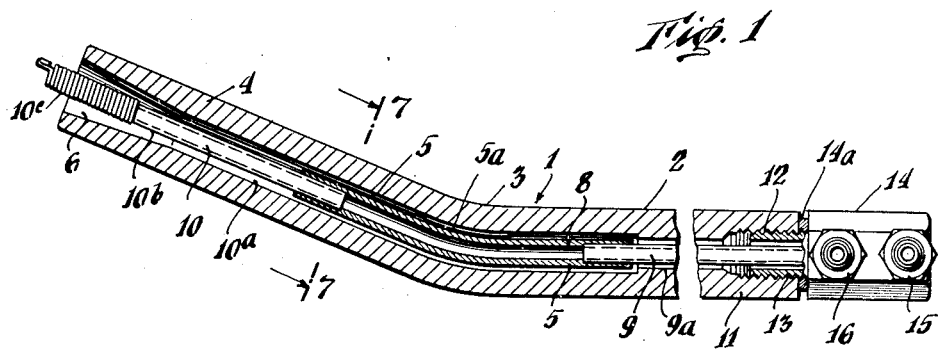
Figure 1 is a part sectional side view, partly broken away, of a curved electrode holder constructed in accordance with the invention.
Figure 2:
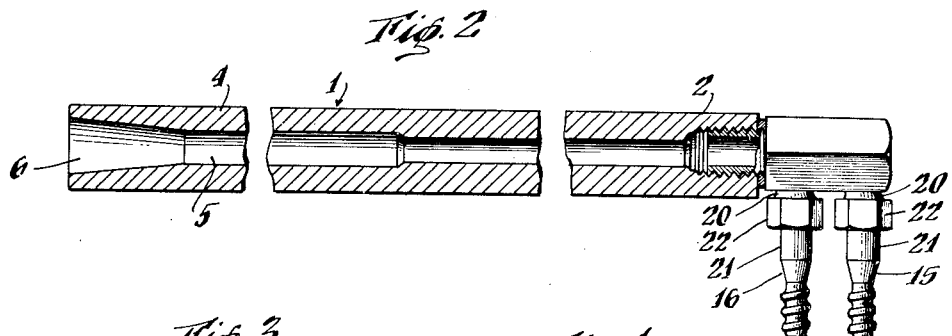
Figure 2 is a sectional plan view, also partly broken away, of Figure 1 with the tube removed.

Referring to the drawings, and firstly to Figures 1 and 2 thereof, the electrode holder, indicated generally by the reference numeral 1, comprises an elongated cylindrical body portion 2, which is curved or bent at a point adjacent the outer or electrode carrying end thereof as indicated at 3 in Figure 1 to provide an offset portion 4 whereby an electrode carried thereby, and not shown in Figures 1 and 2, will be offset with respect to the main body portion 2.

Figure 6:
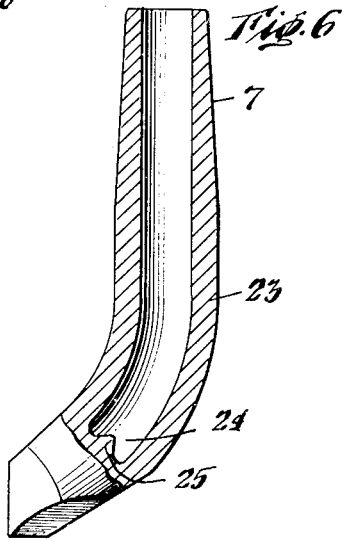
Figure 6 is a sectional view of an electrode suitable for use with such a holder.

The holder 1 is provided with a longitudinal bore 5 extending throughout the length thereof, which bore is of circular cross-section and at the outer end is formed with a diverging or inwardly tapering portion 6 adapted to receive and retain therein the correspondingly tapered end of an electrode, such as the electrode 7 shown in Figure 6, to be more specifically referred to hereafter.

Figure 3:
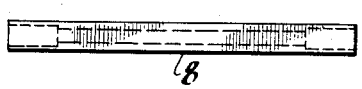
Figure 3 is a side elevation of the bendable tube portion.
Figure 4:
Figure 4 is an end view of Figure 3.

In the bore 5 is located a coolant fluid inlet tube, which in the present instance comprises a curved portion 8 constructed in accordance with the invention and two end portions 9 and 10 of smaller diameter than the bore 5 and communicating respectively with a fluid inlet connection and with the interior of the electrode. As clearly shown in Figures 3 and 4, the tube portion 8 is made of square cross-section and is of a diameter substantially equal to the diameter of the bore 5 so as to be a sliding fit therein. The bore of the tube 8 is slightly increased in diameter at each end thereof, and into these enlarged ends are fitted and brazed or soldered the cylindrical tube portions 9 and 10 above referred to. The portions 9 and 10 being of smaller diameter than the bore 5, an annular space 9a and 10a respectively is left surrounding the said portions for the flow of cooling fluid therealong.

Figure 7:
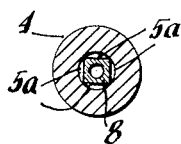
Figure 7 is a section on the line 7—7 of Figure 1 looking in the direction of the arrow.

As will be readily understood the square section tube 8 makes contact throughout its length with the body portions 2 and 4 at four equally spaced points around the periphery of the bore 5 and thus divides the latter into four arcuate shaped passageways 5a (Figure 7) extending parallel to one another throughout the length of the tube 8 and along which coolant fluid may pass.

The bore 5 of the holder is enlarged at the rear end 11 of the latter and is formed with an internal screw thread 12 into which is screwed a spigot 13 of an extension housing 14 carrying lateral inlet and outlet connections 15 and 16 respectively for coolant fluid, with the intermediary of a washer 14a.

Figure 5:
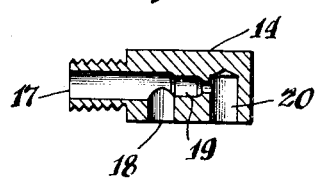
Figure 5 is a sectional side view of the extension carrying the lateral inlet and outlet connections for coolant fluid.

As shown in Figure 5, the housing 14 is formed with a bore 17 of a diameter substantially equal to the diameter of the bore 5 and forms an extension of the said bore. This bore 17 communicates with the lateral opening 18 to which the outlet connection 16 is fitted and extends inwardly of the housing 14 beyond the opening 18 with a reduced diameter, as shown at 19, as far as a further lateral opening 20 to which the inlet connection 15 is fitted. Into the bore 19 is fitted the outer end of the tube portion 9 whereby the whole tube 8, 9, 10 is put into communication with the inlet connection 15.

The lateral connections 15 and 16, as shown in Figure 2, each comprises a nipple 20 engageable with one of the openings 18 and 20, a spigot 21 for connection to rubber hose and a union nut 22 by means of which the two parts 20 and 21 may be detachably connected together.

The end portion 10 of the composite tube is preferably made resiliently flexible and longitudinally adjustable in the manner set forth in the specification of co-pending application Serial No. 752,053. With this end in view and as shown, the said portion 10 comprises a rigid cylindrical part 10b connected at one end thereof to the square section tube 8 and carrying at the other end thereof a portion 10c in the form of a coil spring. The portion 10b may either be formed with an external screw thread at the outer end thereof with the coil spring engaging the threads, or the said end may be left smooth and the coil spring passed over the end so as tightly to engage therewith. By this means the tube portion 10 may be adjusted in length to suit the particular electrode carried by the holder 1. The flexibility of the coil spring 10c, moreover, will enable the said spring to enter and follow the contour of the curved or bent formations of the axial cooling holes of curved shaped electrodes.

A particularly advantageous form of electrode for use with a holder in accordance with this invention is illustrated in Figure 6. As shown in Figure 6, the electrode comprises a body portion 23 having therein an axial cooling hole 24 into which the coil spring 10c passes. At the bottom of the hole 24 is formed an inward projection 25 of conical shape, which merges from its base into the side walls of the hole, whereby coolant fluid emerging from the tube end 10c is constrained to flow outwardly in the hole 24 in all directions radial to the axis of the tube end 10c and then to flow backwardly in the hole about the tube. It is to be understood, however, that any other suitable construction of electrode may be employed with the improved holder.

The manner of manufacture in accordance with this invention of the electrode holder constructed as above set forth will now be described.

The holder 1 is first formed as a straight cylindrical body portion 2 with a longitudinal circular bore 5 therein. A straight square section tube 8 is then fitted at each end respectively with a part 9 and part 10. This composite tube 8, 9, 10 is then inserted into the bore 5 of the holder 1, so as to extend outwardly beyond each end thereof, the tube 8 contacting the bore 5 along the four straight edges thereof and dividing the said bore into four arcuate shaped passageways spaced around the tube 8.

The body portion 2 with the composite tube 8—10 therein is now bent in a suitable bending machine at the point 3, within the area of the square tube 8, through any suitable angle, such as an angle of 22½°, as shown in Figure 1. During this bending operation, the tube 8 will be caused to bend likewise and follow the altered contour of the bore 5 without, in the majority of instances, any of the aforesaid passageways becoming blocked. It may happen, however, that one or perhaps two of the sides of the tube 8 may be distorted and block the respective passages, but the others will remain open and allow the free flow of the coolant fluid therealong.

The housing 14 is now fitted into the end 11 of the body portion 2, such that the end of the tube 9 extends into the bore 19 communicating with the inlet opening 20 and the bore 5 and the arcuate passageways 5a communicating with the outlet opening 18.

An electrode, such as the electrode 23, is then inserted into the tapered end 6 of the bore 5, such that the coil spring 10c protrudes into the axial cooling hole 24 therein.

In the use of such electrode holder, the electrode is cooled by the flow of coolant fluid through the inlet connection 15 along the composite tube 8—10, out into the hole 24 in the electrode and back along the annular space 10a, one or more of the passageways 5a and the annular space 9a to the outlet opening 18 through which it is discharged.

The coolant fluid employed may be of any suitable nature, such as water, brine or other refrigerant liquid.

As will be appreciated, by means of this invention, a simple and efficient means is provided for rapidly and at low cost producing a curved tool shank or holder having provision for cooling a tool carried thereby.

Whilst the invention has been particularly described as relating to a holder for a resistance welding electrode, it is to be understood that it may equally apply to any tool shank or tool holder on or in which is mounted a tool which requires to be cooled, in use, so as to prevent overheating and consequent damage to the working tip of the tool.

What is claimed as new and desired to be secured by Letters Patent is:

1. A welding electrode holder comprising, in combination, a shank having a longitudinal passage extending therethrough with a socket for receiving a welding electrode at one end of said passage and having a portion thereof of arcuate configuration to form an offset welding electrode holder, and a cooling fluid conduit extending through said passage, said conduit spaced from and being in positively gripping engagement with said shank interiorly of said passage of said arcuate portion at definite points only thereon.

2. A welding electrode holder comprising, in combination, a shank having a longitudinal passage extending therethrough and having a portion thereof of arcuate configuration to form an offset welding electrode holder, a socket at one end of said passage for receiving a welding electrode and a cooling fluid conduit extending through said passage with longitudinally substantially line gripping contact therewith, said conduit and said passage having cross sections of different configuration, said conduit being inextricable.

3. A welding electrode comprising, in combination, a hollow curved shank having a socket at one end thereof for receiving a welding electrode, an effectively integrally formed cooling fluid conduit in the bore of said shank and having a diameter substantially equal to, but of cross-section different from that of said bore, said conduit following the contour of said bore and engaging therewith in positively gripping engagement throughout its length at spaced points only around the periphery of the bore, the interspace between the conduit and shank providing a passage for cooling fluid.

4. A welding electrode holder comprising, in combination, a hollow shank having an arcuate section with a socket for receiving a welding electrode at one end thereof, and a composite cooling fluid conduit extending through the passage in said shank, said conduit comprising a straight inlet portion adapted to be connected to a source of cooling fluid, a curved portion secured to said inlet portion and engaging the arcuate section of said electrode holder with positively gripping action along at least one longitudinal line, and a straight outlet portion secured to the free end of said curved portion.

5. A welding electrode holder comprising, in combination, a curved shank having a passage extending therethrough with a welding electrode socket at one end thereof, and a composite cooling fluid conduit extending through said passage, said conduit comprising a straight inlet portion adapted to be connected to a source of cooling fluid, a curved portion secured to said inlet portion and having a different cross-section from said passage whereby said curved portion engages the interior parts of the shank at spaced points with positively gripping action only around the periphery of said passage, and a straight outlet portion secured to the free end of said curved portion.

6. A welding electrode comprising in combination, a shank having a longitudinal passage extending therethrough, a welding tip connected in offset relationship therewith, said tip having a bore arcuately formed therein, and inlet coolant means placed within said shank having said arcuate bore, said coolant means being contiguous with said bore in said shank only at predetermined spaced points and separated from each other at all other points.

NORMAN ALBERT TUCKER.

(References on following page)

REFERENCES CITED

The following references are of record in the file of this patent:

UNITED STATES PATENTS

| Number | Name | Date |
|---|---|---|
| Re. 13,530 | Warren | Feb. 11, 1913 |
| 1,137,520 | Nicolaus | Apr. 27, 1915 |
| 1,878,790 | Lund | Sept. 20, 1932 |
| 1,984,554 | Staples | Dec. 18, 1934 |
| 2,088,936 | Von Henke | Aug. 3, 1937 |
| 2,134,110 | Eckman | Oct. 25, 1938 |
| 2,145,182 | Kirch | Jan. 24, 1939 |
| 2,234,435 | Johnson | Mar. 11, 1941 |
| 2,247,133 | Rees | June 24, 1941 |
| 2,271,119 | Cox | Jan. 27, 1942 |
| 2,374,979 | Carlson et al. | May 1, 1945 |
| 2,429,825 | Kruitbosch | Oct. 28, 1947 |

FOREIGN PATENTS

| Number | Country | Date |
|---|---|---|
| 698,949 | Germany | Oct. 24, 1940 |